US007151928B2

United States Patent
Vance

(10) Patent No.: US 7,151,928 B2
(45) Date of Patent: Dec. 19, 2006

(54) ELEMENT OUTAGE MONITORING IN A WIRELESS TELECOMMUNICATION SYSTEM

(75) Inventor: Charles Terry Vance, Atlanta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 417 days.

(21) Appl. No.: 10/232,066

(22) Filed: Aug. 30, 2002

(65) Prior Publication Data

US 2004/0203428 A1     Oct. 14, 2004

(51) Int. Cl.
 *H04Q 7/20*     (2006.01)
(52) U.S. Cl. .................... 455/424; 455/67.11
(58) Field of Classification Search ........... 455/423, 455/424, 425, 67.11, 67.14, 67.7; 379/1.01, 379/9.03, 9.04, 29.1
See application file for complete search history.

(56) References Cited

U.S. PATENT DOCUMENTS

| | | | |
|---|---|---|---|
| 5,285,494 A * | 2/1994 | Sprecher et al. ............ 455/423 |
| 5,719,563 A * | 2/1998 | Thompson, Jr. ........ 340/870.02 |
| 5,987,306 A * | 11/1999 | Nilsen et al. ............. 455/67.11 |
| 6,067,030 A * | 5/2000 | Burnett et al. ......... 340/870.05 |
| 6,101,500 A * | 8/2000 | Lau ........................ 707/103 R |
| 6,151,494 A * | 11/2000 | Gutowski et al. ............ 455/424 |
| 6,725,032 B1 * | 4/2004 | Sheridan et al. ............. 455/419 |
| 6,757,543 B1 * | 6/2004 | Moran et al. ............. 455/456.1 |
| 2004/0203440 A1 * | 10/2004 | Katz ........................ 455/67.11 |

* cited by examiner

*Primary Examiner*—Nguyen T. Vo
(74) *Attorney, Agent, or Firm*—Parks Knowlton LLC; J. Perry Herndon, Esq.; Robert Evora

(57) ABSTRACT

A method that provides improved element outage monitoring in a wireless telecommunication system comprises obtaining data indicating a state of the element in the wireless telecommunication system and outputting a status to a display if the state comprises a first condition. The first condition may comprise at least one sector of a base transceiver station (BTS) being non-operational. In addition, the display may be located in a Network Operation Center (NOC) or a Customer Service Center (CSC) placed on a wall in plain view of a network operator or a customer service representative.

35 Claims, 6 Drawing Sheets

| BSC | BTS | SECTORS | BTA | SITE |
|---|---|---|---|---|
| 74 | 18 | 0 | 020 | 020 |
| 74 | 19 | 1,2 | 020 | 021 |
| 74 | 20 | ALL | 020 | 022 |

*FIG. 3A*

| BSC 74 | BTS 18 | SECTORS 0 | BTA 020 | SITE 020 |
|---|---|---|---|---|

*FIG. 3B*

| BSC | BTS | SECTORS | BTA | SITE |
|---|---|---|---|---|
| 74 | 18 | 0 | 020 | 020 |

*FIG. 3C*

ELEMENT OUTAGE MONITORING IN A WIRELESS TELECOMMUNICATION SYSTEM

DESCRIPTION OF THE INVENTION

1. Field of the Invention

The invention relates generally to systems and methods for providing improved element outage monitoring in a wireless telecommunication system, and more particularly, to systems and methods for obtaining and displaying a state of an element in a wireless telecommunication system.

2. Background of the Invention

The use of telephone products and systems in the day-to-day lives of most people is continually growing. With the advent and steady growth of wireless telecommunications, wireless telecommunication systems will increasingly be utilized for not only voice data, but also for sending and receiving packetized data for use on the Internet, for example. In an effort to lower operating costs, increase system availability, and increase value for its subscribers, wireless telecommunications providers wish to monitor the outage of elements within the wireless telecommunication system. Wireless telecommunication providers realize a time and a cost savings in network maintenance by monitoring the outage of elements within the wireless telecommunication system.

Therefore, the need to efficiently provide improved element outage monitoring in a wireless telecommunication system has become a common need for many wireless telecommunication providers. More specifically, obtaining and displaying a state of an element in the wireless telecommunication system has become a critical need for many wireless telecommunication providers. This is because in an increasingly competitive environment, high network availability and reliability are important factors in the overall satisfaction of subscribers.

One solution to the element outage monitoring problem is for an operator in a network operation center to manually maintain a log of element outages. For example, elements in a wireless telecommunications system frequently go into an off-air or outage state, thus becoming non-operational. It is the function of the operator to manage the outage activities, notify the proper personnel, and escalate the outage repair activities as necessary. In the network operation center, it is very difficult to manually manage a running list of elements that are concurrently non-operational. This is because operators in the network operation center have typically kept the running lists on notepads or on small adhesive note sheets. In addition, the process of repairing the outage of an elements generally takes several hours over the course of an operator's shift, and thus tracking the status of a particular outage may require multiple operators. Great inefficiencies are created in this procedure. Coordinating the outage information on notepads or on small adhesive note sheets between multiple network operators across shifts is inherently unreadable and conducive to errors. In addition, this conventional solution does not conveniently allow for the archiving and analysis of the data received. Accordingly, the ability to efficiently provide element outage monitoring in a wireless telecommunication system remains an elusive goal.

Thus, there remains a need for efficiently monitoring element outages in a wireless telecommunication system. In addition, there remains a need for systems and methods for obtaining and displaying a current state of an element in the wireless telecommunication system as well as creating historical archives of such status of elements.

SUMMARY OF THE INVENTION

Consistent with the present invention, an improved element outage monitoring method and system are provided that avoid problems associated with prior art element outage monitoring systems and methods as discussed herein above.

In one aspect, an improved method for providing element outage monitoring in a wireless telecommunication system comprises obtaining data indicating a state of the element in the wireless telecommunication system, and outputting a status to a display if the state comprises a first condition.

In another aspect, an improved system for providing element outage monitoring in a wireless telecommunication system comprises a component for obtaining data indicating a state of the element in the wireless telecommunication system, and a display connected to the component for obtaining data, the display configured for outputting a status if the state comprises a first condition.

In yet another aspect, a computer-readable medium on which is stored a set of instructions for providing improved element outage monitoring in a wireless telecommunication system, which when executed perform stages comprising obtaining data indicating a state of the element in the wireless telecommunication system, and outputting a status to a display if the state comprises a first condition.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 3A is a illustration of an exemplary display consistent with an embodiment of the present invention;

FIG. 3B is a illustration of an exemplary display consistent with an embodiment of the present invention;

FIG. 3C is a illustration of an exemplary display consistent with an embodiment of the present invention;

DESCRIPTION OF THE EMBODIMENTS

Figure 1:
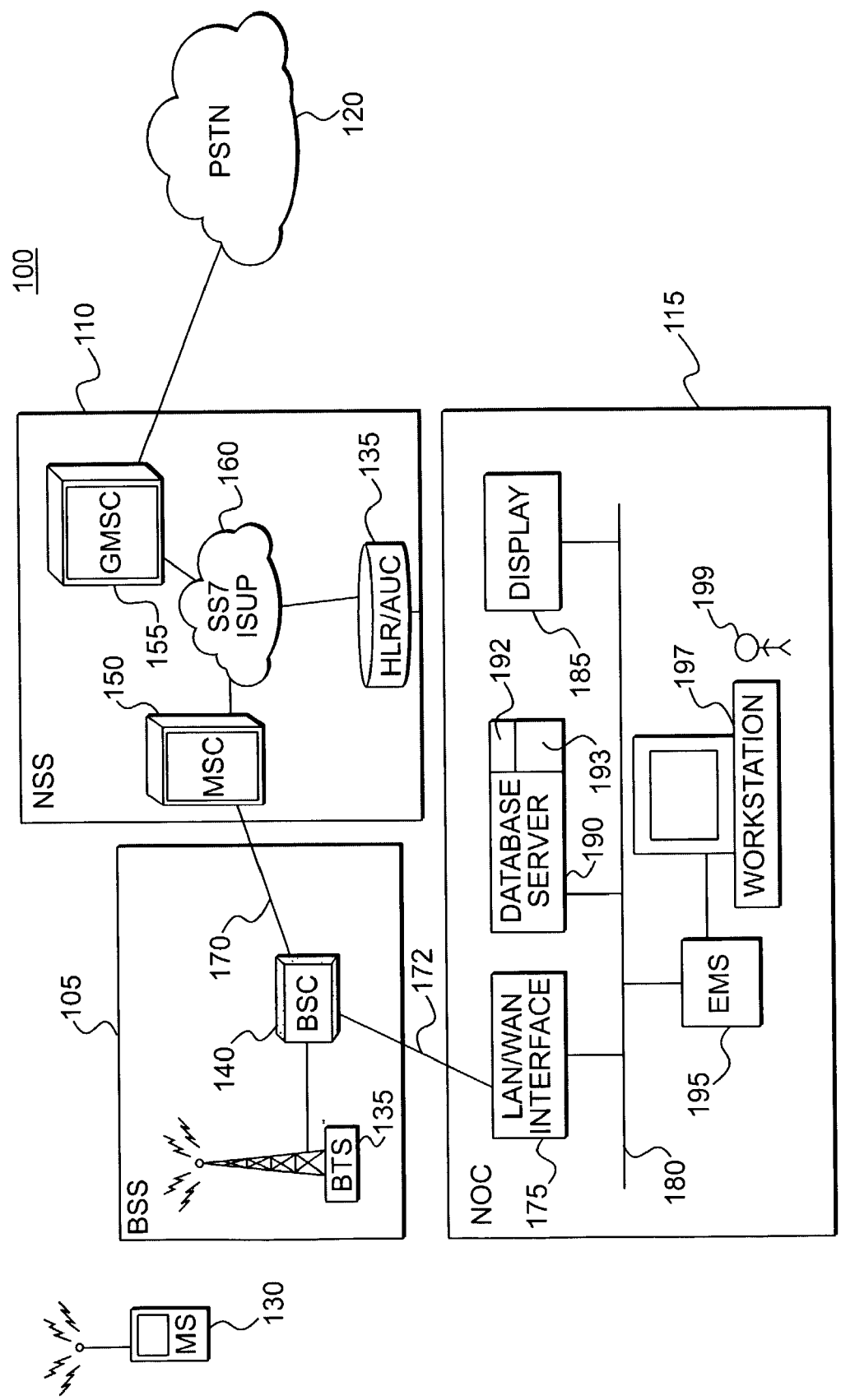
FIG. 1 is a functional block diagram of an exemplary system for providing element outage monitoring in a wireless telecommunication system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, an improved system for providing element outage monitoring in a wireless telecommunication system, comprises a component for obtaining data indicating a state of an element in the wireless telecommunication system, and a display connected to the component for obtaining data, the display configured for outputting a status if the state comprises a first condition.

As herein embodied and illustrated in FIG. 1, a system for providing element outage monitoring in a wireless telecommunication system 100 may comprise a base station subsystem (BSS) 105, a network and switching subsystem (NSS) 110, a network operation center (NOC) 115, a mobile station (MS) 130, and a publicly switched telephone network (PSTN) 120. The elements of system 100 will be described in greater detail below. Consistent with an embodiment of the invention, the component for obtaining data indicating a state of an element in the wireless telecommunication system may comprise an element management system (EMS) 195 or a workstation 197, the network operator may comprise a network operation center (NOC) operator 199, and the element in the wireless telecommunication system may comprise a base transceiver station (BTS) 135. Those of ordinary skill in the art, however, will appreciate that other elements of system 100 may comprise the component for obtaining data indicating a state of an element, the network operator, and the element in the wireless telecommunication system.

System 100 may utilize GSM technology enhanced with GPRS in embodiments of the present invention. Those of ordinary skill in the art will appreciate, however, that other wireless telecommunication technologies standards may be employed, for example, FDMA, TDMA, CDMA, CDMA 2000, UTMS, and EDGE, without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 140, and the base transceiver station (BTS) 135. BSS 105 connects to MS 130 through a radio interface and connects to NSS 115 through an interface 170. BSC 140 controls BTS 135 and may control a plurality of other base transceiver stations in addition to BTS 135. BTS 135 may comprise radio transmission and reception equipment located at an antenna site. Associated with BSS 105, a transcoder/rate adaption unit (TRAU) (not shown) may perform speech encoding and speech decoding and rate adaptation for transmitting data. As a subpart of BTS 135, the TRAU may be located away from BTS 135, for example, at a mobile switching center located in NSS 110. When the TRAU is located in this way, the low transmission rate of speech code channels allows more compressed transmission between BTS 135 and the TRAU.

Interface 170 between NSS 110 and BSS 105, and a wide area network 172 between BSC 140 and NOC 115, may comprise T-1 lines using X.25 or TCP/IP protocol, for example.

MS 130 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 130 may utilize cellular telephone protocols such as wireless application protocol (WAP), or blue-tooth protocol.

Still referring to FIG. 1, NSS 110 may comprise a mobile switching center (MSC) 150, a first network 160, a home location register/authentication center (HLR/AUC) 135, and a gateway mobile switching center (GMSC) 155. NSS 110 manages the communication between subscribers, for example, system operator 125 using MS 130, and other telecommunications users, for example, those using publicly switched telephone network (PSTN) 120. PSTN 120 may comprise, for example, the worldwide voice telephone network.

MSC 150 coordinates call set-up to and from subscribers such as system operator 125 using MS 130. MSC 150 may control several base station controllers such as, and similar to BSC 140. GMSC 110 is used to interface with external networks for communication with users outside of the wireless system, such users on PSTN 120.

HLRIAUC 135 may comprise a stand-alone computer without switching capabilities, a database which contains subscriber information, and information related to the subscriber's current location, but not the actual location of the subscriber. The AUC portion of HLR/AUC 135 manages the security data for subscriber authentication. Another subdivision of HLR/AUC 135 may include an equipment identity register (EIR) (not shown) which may store data relating to mobile equipment (ME).

NSS 110 may also include a visitor location register (VLR) (not shown). The VLR links to one or more mobile switching center located on other systems, temporarily storing subscription data of subscribers currently served by MSC 150. The VLR holds more detailed data than HLR/AUC 135. For example, the VLR may hold more current subscriber location information than the location information at HLR/AUC 230.

GMSC 155 is utilized to interface with PSTN 120. In order to set up a requested call, the call is initially routed to GMSC 155, that finds the correct home location register by knowing the director number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) in an ISDN user part (ISUP) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control. ISUP defines the protocol and procedures used to set-up, manage, and release trunk circuits that carry voice and data calls over a public switched telephone network. ISUP is used for both ISDN and non-ISDN calls. Calls that originate and terminate at the same switch do not use ISUP signaling.

Still referring to FIG. 1, network operation center (NOC) 115 may comprise a LAN/WAN interface 175, a local area network (LAN) 180, a display 185, a database server 190, a first database 192, a second database 192, an element management system (EMS) 195, a workstation 197, and a NOC operator 199.

LAN/WAN interface 175 interfaces WAN 172 and LAN 180, thus connecting the elements connected to LAN 180 with BSC 140. A WAN may comprise a communications network that covers a wide geographic area, such as state or country, whereas a LAN may be contained within a building or complex connecting servers, workstations, a network operating system, and a communications link.

Figure 2:
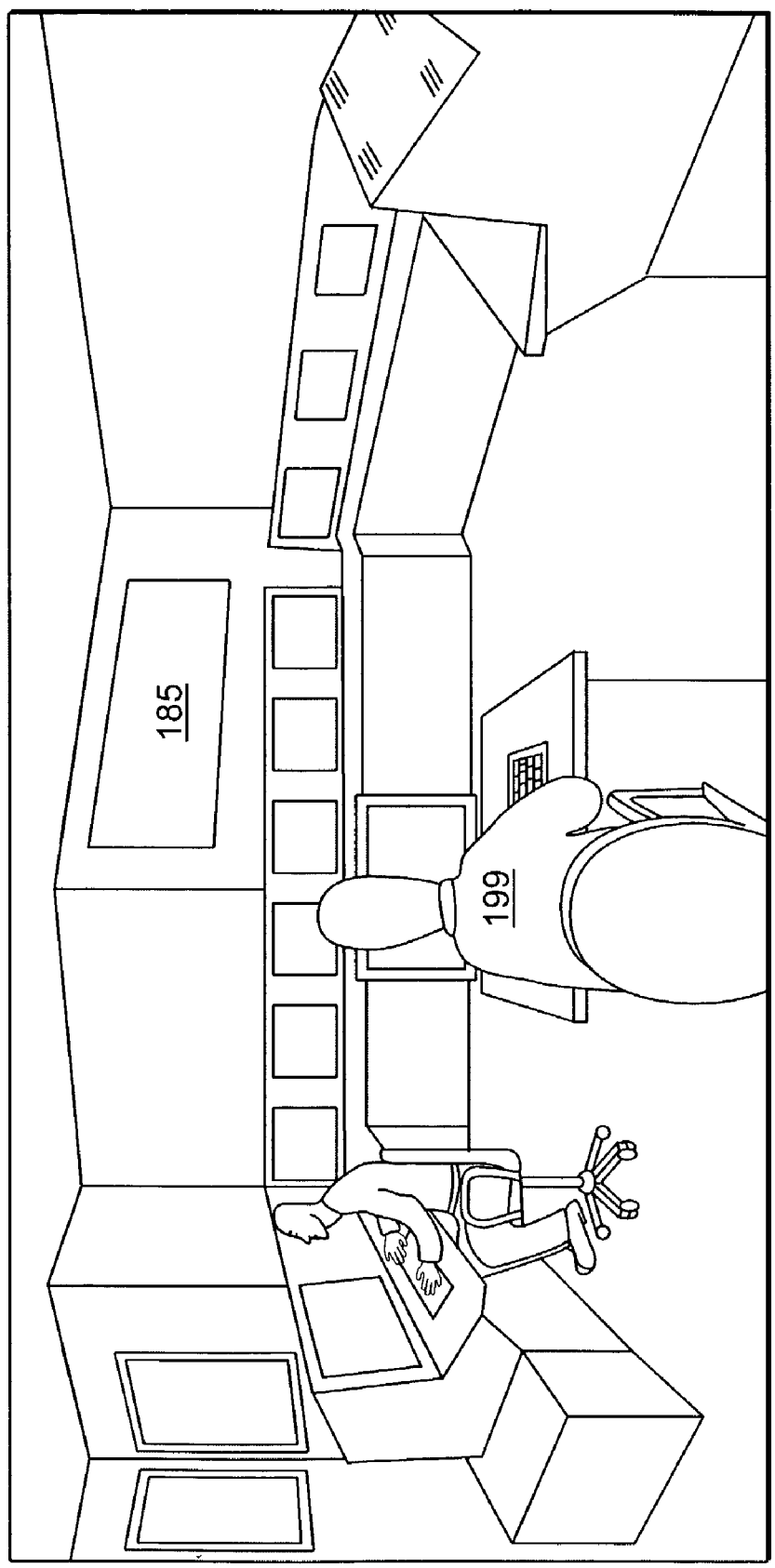
FIG. 2 is an illustration of an exemplary control room used in a network operations center consistent with an embodiment of the present invention.

Connected to LAN 180 is a display 185. Display 185 may be employed in a control room setting within NOC 115 or a customer service center (not shown). As illustrated by FIG. 2, for example, display 185 may be mounted on a wall in plain view of NOC operator 199 when implemented in the control room setting. Referring to FIG. 3A through FIG. 3C, display 185 may comprise a panel display unit (PDU) 310, a variable message display unit (VMDU) 340, a message display unit (MDU) 360, or a micro message display unit (MMDU) (not shown), all marketed by Texas Digital Systems of 400 Technology Parkway College Station, Tex. 77845. Those of ordinary skill in the art will appreciate that may other types of displays may be employed in a variety of different settings.

PDU 310 may comprise a large multi-line LED displays available with 1.2 inch or 2.0 inch character heights. Sizes of PDU 310 may range from 2 line by 24 characters to 24 lines by 80 characters or other custom sizes. One benefit of PDU 310 is its ability to maximize the amount of information displayed without sacrificing viewability.

VMDU 340 may comprise 4, 6, or 8-inch character heights and lengths from 3 to 12 feet. VMDU 340 can display single or multiple lines of information in various font sizes depending on the information to be displayed and viewing distance requirements. For example, in a 6-inch character heights version, VMDU 340 can be configured to show a single line of 6 inch characters, 2 lines of 3 inch characters, three lines of 2 inch characters, or one line of 4 inch and one line of 2 inch characters. VMDU 340 may be equipped with color LED technology, 160-degree field view, positive message acknowledgment, audible alarms, 32k message buffer, or a battery backup.

MDU 360 may be available as single-line, multicolor-scrolling fonts in either 2.0 inch or 4.0 inch characters, viewable at distances of 110 feet and 220 feet respectively. With a special non-glare filter, MDU 360 may be viewable at a 160-degree angle, which makes them popular in large call centers, help desks, and command centers. Using 32k of on-board battery-backed memory, MDU 360 may store and display a large number of messages. Like VMDU 310, MDU 360 may be divided into display segments called logical panels which allow a unit to display multiple messages at once.

MMDU may be designed as a personal display device. This miniature LED display may be mounted on a computer monitor, cubicle wall, or desktop to provide statistics and other critical information on an individual basis. The MMDU may be used in a manager or a supervisor's office where access to the larger displays is restricted. The MMDU can also be used in facilities with high cubicle walls where full size displays are ineffective due to line of sight restrictions. The MMDU may be available in 16 and 32 character models and have many useful features including the ability to display static, scrolling, and blinking messages, audible alarms, 8k message buffer, battery backup, and internal clock/calendar.

Display 185, may be driven, through LAN 180, by EMS 195, workstation 197, or a database server 190, with data from a first database 192 or data from a second database 193. Database server 190 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information.

EMS 195 is a device used to detect, diagnose, and correct problems on system 100 effecting the security or reliability of system 100. For example, EMS 195 may detect a state of any element comprising system 100. Specifically, a state of BTS 135 may include, for example, information relating to whether BTS 135 or a portion of BTS 135 is non-operational. Like database server 190, EMS 195 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. Workstation 197 allows NOC operator 199 to interface with EMS 195. Workstation 197 may comprise, for example, a scalable performance architecture (SPARC) station marketed by Sun Mircosystem, Inc. of 901 San Antonio Road Palo Alto, Calif. 94303-4900.

Figure 4:
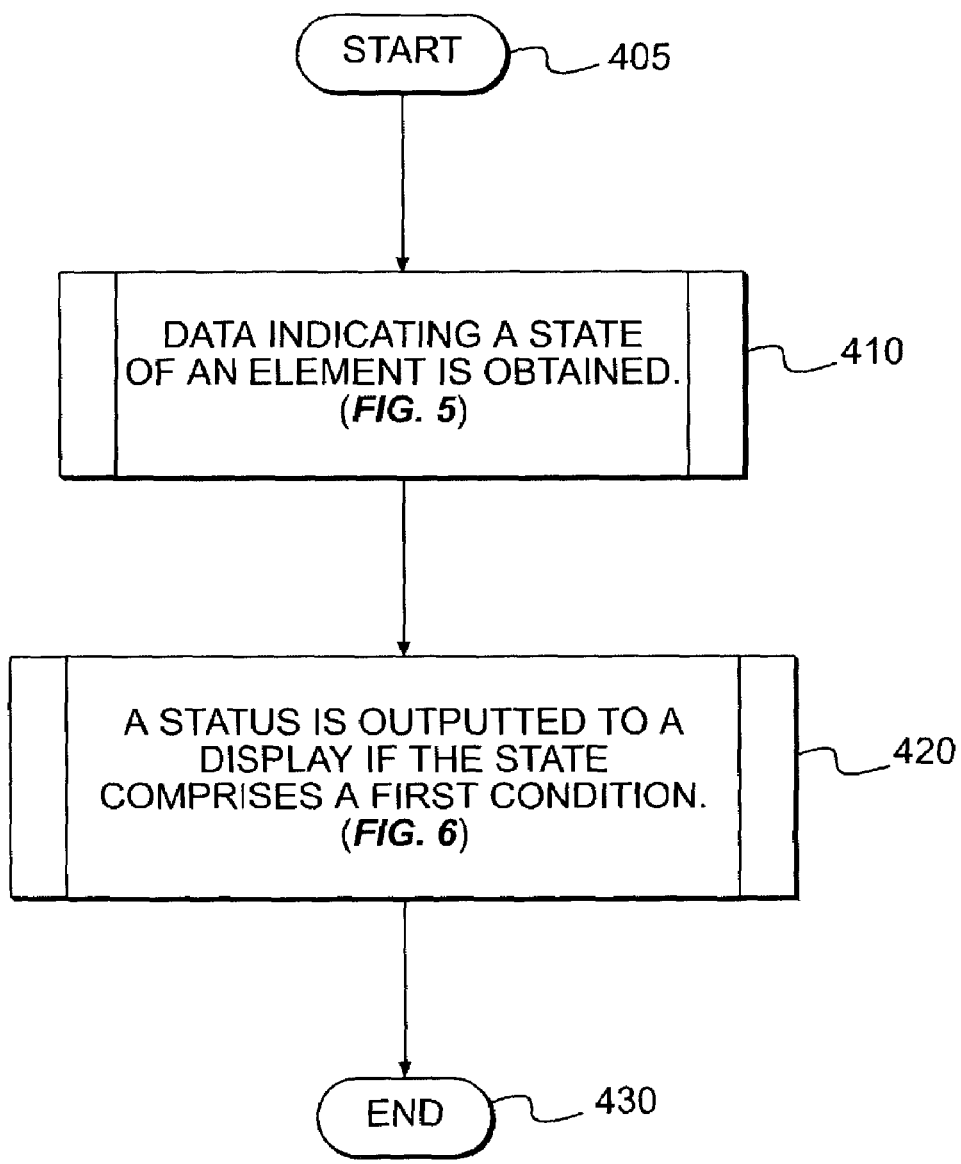
FIG. 4 is a flow chart of an exemplary method for providing element outage monitoring in a wireless telecommunication system consistent with an embodiment of the present invention.
Figure 5:
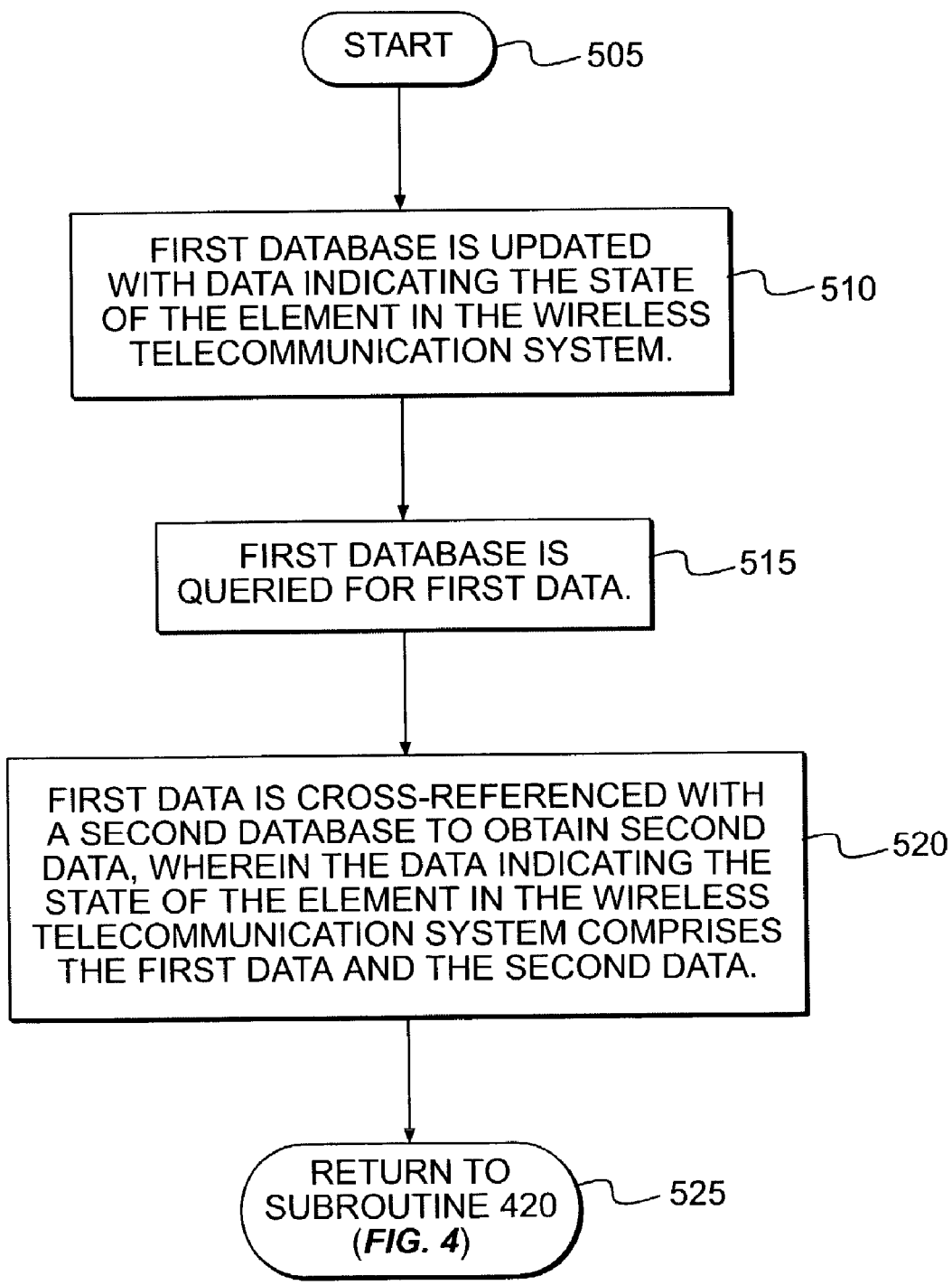
FIG. 5 is a flow chart of an exemplary subroutine used in the exemplary method of FIG. 4 for obtaining data indicating a state of an element in the wireless telecommunication system consistent with an embodiment of the present invention.
Figure 6:
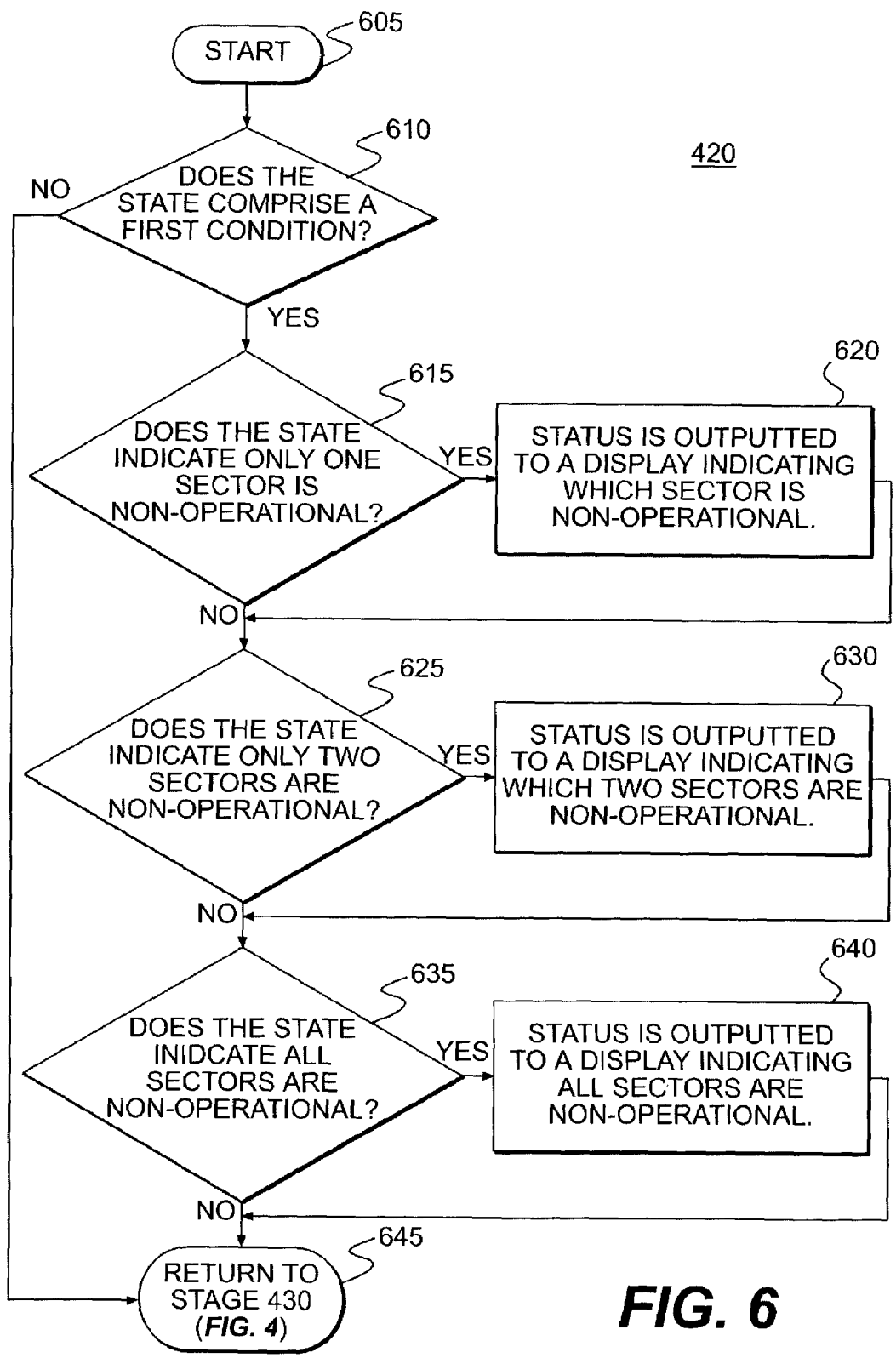
FIG. 6 is a flow chart of an exemplary subroutine used in the exemplary method of FIG. 4 for outputting a status to a display if the state comprises a first condition consistent with an embodiment of the present invention.

FIG. 4 is a flow chart setting forth the general stages involved in exemplary method 400 for providing element outage monitoring in a wireless telecommunication system consistent with an embodiment of the present invention. The implementation of the stages of exemplary method 400 in accordance with an exemplary embodiment of the present invention will be described in greater detail in FIG. 5 through FIG. 6. Exemplary method 400 begins at starting block 405 and proceeds to exemplary subroutine 410 where data indicating a state of an element is obtained. The stages of exemplary subroutine 410 are shown in FIG. 5 and will be described in greater detail below. From exemplary subroutine 410, where data indicating a state of an element is obtained, exemplary method 400 continues to exemplary subroutine 420 where a status is outputted to a display if the state comprises a first condition. The stages of exemplary subroutine 420 are shown in FIG. 6 and will be described in greater detail below. Once the status is outputted to a display if the state comprises a first condition in exemplary subroutine 420, exemplary method 400 ends at stage 430.

FIG. 5 describes exemplary subroutine 410 from FIG. 4 for obtaining data indicating a state of an element consistent with an embodiment of the present invention. Exemplary subroutine 410 begins at starting block 505 and advances to stage 510 where first database 192 is updated with the first data. For example, BSC 140 may control at least one BTS, such as BTS 135. BTS 135 may cover a specific geographic area divided into sectors 1, 2, and 3, for example. BSC 140 may poll BTS 135 to determine if any of the sectors of BTS 135 are non-operational, thus determining the state of BTS 135. The polling results may be sent to database server 190 through WAN 172, LAW/WAN interface 175, and LAN 180, and saved as the first data in first database 192. If the element comprises BTS 135, the first data may comprise a BSC code for BSC 140, a BTS code for BTS 135, and a sector code indicating which sectors are non-operational.

From stage 510 where first database 192 is updated with the first data, exemplary subroutine 410 advances to stage 515 where first database 192 is queried for the first data. For example, a software module on EMS 195 or workstation 197, through LAN 180, may cause database server 190 to query first database 192 for the first data. Database server 190 may then send the first data to either EMS 195 or workstation 197 back through LAN 180.

Once first database 192 is queried for the first data in stage 515, exemplary subroutine 410 advances to stage 520 where the first data is cross-referenced with second database 193 to obtain the second data, wherein the data indicating the state of the element in wireless telecommunication system 100 comprises the first data and the second data. For example, while first data may, by itself, indicate the state of the element in wireless telecommunication system 100, it may not be in a form recognizable by some who may require the information contained in the first data. Given this, the first data may be cross referenced to second database 193 to obtain data in a more recognizable form For example, a software module on EMS 195 or workstation 197, through LAN 180, may cause database server 190 to query second database 193 with the first data to obtain the second data. Database server 190 may then send the second data to either EMS 195 or workstation 197 back through LAN 180. The first data, for example, may comprise a BSC code and a BTS code recognizable by NOC operator 199. The second data may comprise a basic trading area (BTA) code corresponding to BSC 140, and a site code corresponding to BTS 135. The BTA code and the site code may be recognizable by a customer service manager, for example. The first data and the second data may be combined to form the data indicating the state of the element in wireless telecommunication system 100.

After the first data is cross-referenced with the second database 193 to obtain the second data in stage 520, exemplary subroutine 410 continues to stage 525 and returns to subroutine 420 of FIG. 4.

FIG. 6 describes exemplary subroutine 420 from FIG. 4 for outputting a status to display 185 if the state comprises a first condition. Exemplary subroutine 420 begins at starting block 605 and advances to decision block 610 where it is determined if the state comprises the first condition. For example a software module on EMS 195 or workstation 197 may analyze the first data or the second data to determine if any sectors are non-operational and may compare this information with the first condition. The first condition may comprise at least one sector of BTS 135 being non-operational.

If it is determined at decision block 610 that the status comprises the first condition, exemplary subroutine 420 advances to decision block 615 where it is determined if the state indicates only one sector is non-operational. For example a software module on EMS 195 or workstation 197 may analyze the first data or the second data to determine if only one sector is non-operational.

If it is determined at decision block 615 that the state indicates only one sector is non-operational, exemplary subroutine 420 advances to stage 620 where the status is outputted to display 185 indicating which sector is non-operational. For example, if the first data indicates sector "0" of BTS code "18" on BSC code "74" is non operational, and if PDU 310 is used as display 185, the output may appear as shown in row 312 of FIG. 3A. In addition, row 312 indicates the second data comprises BTA code "020" and site code "020".

From stage 620 where the status is outputted to display 185 indicating which one sector is non-operational, or from decision block 615, if the state does not indicate only one sector is non-operational, exemplary subroutine 420 advances to decision block 625 where it is determined if the state indicates only two sectors are non-operational. For example a software module on EMS 195 or workstation 197 may analyze the first data or the second data to determine if only two sector are non-operational.

If it is determined at decision block 625 that the state indicates that only two sectors are non-operational, exemplary subroutine 420 advances to stage 630 where the status is outputted to display 185 indicating which two sectors are non-operational. For example, if the first data indicates sectors "1" and "2" of BTS code "19" on BSC code "74" are non operational, and if PDU 310 is used as display 185, the output may appear as shown in row 314 of FIG. 3A. In addition, row 314 indicates the second data comprises BTA code "020" and site code "021".

From stage 630 where the status is outputted to display 195 indicating which two sectors are non-operational, or from decision block 625, if it is determined that the state does not indicate that only two sectors are non-operational, exemplary subroutine 420 advances to decision block 635 where it is determined if the state indicates that all sectors are non-operational. For example a software module on EMS 195 or workstation 197 may analyze the first data or the second data to determine if all sectors are non-operational.

If it is determined at decision block 635 that the state indicates that all sectors are non-operational, exemplary subroutine 420 advances to stage 640 where the status is outputted to display 185 indicating all sectors are non-operational. For example, if the first data indicates sectors "0", "1", and "2" of BTS code "20" on BSC code "74" are non operational, and if PDU 310 is used as display 185, the output may appear as shown in row 316 of FIG. 3A. In addition, row 316 indicates the second data comprises BTA code "020" and site code "022".

From stage 640 where the status is outputted to display 185 indicating all sectors are non-operational, or from decision block 635, if it is determined that the state does not indicate that all sectors are non-operational, or from decision block 610, if it is determined that the state does not comprise a first condition, exemplary subroutine 420 advances to stage 645 and returns to stage 430 of FIG. 4.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing element outage monitoring in a wireless telecommunication system, comprising:
    updating a first database with first data comprising:
        polling a base transceiver station (BTS) using a base station controller (BSC) to obtain polling results, the polling results indicating if any sector of the BTS is non-operational;
        forwarding the polling results to the first database; and
        storing the polling results in the first database,
    obtaining data indicating a state of the element in the wireless telecommunication system, wherein said obtaining step includes, querying the first database for the first data, querying a second database using the first data to obtain second data; and
    outputting a status to a display if the state comprises a first condition.

2. The method of claim 1, wherein the element comprises the base transceiver station (BTS) being polled.

3. The method of claim 2, wherein the first condition comprises at least one sector of the BTS being non-operational.

4. The method of claim 3, wherein the status indicates which sectors of the BTS are non-operational.

5. The method of claim 3, wherein if the state comprises all sectors of the BTS being non-operational, the status indicates that the BTS is non-operational.

6. The method of claim 1, wherein querying the first database further comprises polling the first database.

7. A system for providing base transceiver station (BTS) outage monitoring in a wireless telecommunication system, comprising:
    a base station controller (BSC) for updating a first database with first data, the BSC configured to update the first database by:
        polling the BTS to obtain polling results, the polling results indicating if any sector of the BTS is non-operational; and
        forwarding the polling results to the first database;
    a component for obtaining data indicating a state of the BTS in the wireless telecommunication system, wherein said component queries the first database for the first data and queries a second database using the first data to obtain second data, said component comprising a server configured for querying the first database for first data, and querying the second database using the first data to obtain the second data, the data indicating the state of the element comprising the first data and the second data; and
    a display connected to the component for obtaining data, the display configured for outputting a status if the state comprises a first condition.

8. The system of claim 7, wherein the first condition comprises at least one sector of the BTS being non-operational.

9. The system of claim 8, wherein the status indicates which sectors of the BTS are non-operational.

10. The system of claim 8, wherein if the state comprises all sectors of the BTS being non-operational, the status indicates that the BTS is non-operational.

11. The system of claim 7, wherein the display comprises at least one of a panel display unit (PDU), a variable message display unit,(VMDU), a message display unit (MDU), and a micro message display unit (MMDU).

12. The system of claim 11, wherein the display is located in at least one of a Network Operation Center (NOC) and a Customer Service Center (CSC).

13. The system of claim 12, wherein the display is placed on a wall in plain view of at least one of a network operator and a customer service representative.

14. The system of claim 7, wherein the component for obtaining the data is further configured for polling the first database.

15. The method of claim 1 wherein the first data comprises a base transceiver station (BTS) code, a base station controller (BSC) code, and a sector code.

16. The method of claim 15 wherein,
    the BTS code represents a BTS,
    the BSC code represents a BSC that controls the BTS; and
    the sector code indicates an operational status of at least one sector of the BTS.

17. The method of claim 15 wherein the second data comprises a basic trading area code and a site code.

18. The method of claim 17 wherein the basic trading area code corresponds to the BSC and the site code corresponds to the BTS.

19. The method of claim 17 wherein the status displayed comprises the BTS code, the BSC code, the basic trading area code, the site code, and the sector code.

20. A computer-readable medium on which is stored a set of instructions for providing element outage monitoring in a wireless telecommunication system, which when executed perform stages comprising:
    updating a first database with first data by:
        directing a base station controller (BSC) to poll a base station transceiver (BTS) to obtain polling results, the polling results indicating if any sector of the BTS is non-operational; and
        directing the BSC to forward the polling results to the first database;
    obtaining data indicating a state of the element in the wireless telecommunication system, wherein said obtaining step includes, querying a first database for first data and querying a second database using first data to obtain second data; and
    outputting a status to a display if the state comprises a first condition.

21. The computer-readable medium of claim 20, wherein the element comprises the base transceiver station (BTS) being polled.

22. The computer-readable medium of claim 21, wherein the first condition comprises at least one sector of the BTS being non-operational.

23. The computer-readable medium of claim 22, wherein the status indicates which sectors of the BTS are non-operational.

24. The computer-readable medium of claim 22, wherein if the state comprises all sectors of the BTS being non-operational, the status indicates that the BTS is non-operational.

25. The computer-readable medium of claim 20, wherein querying the first database further comprises polling the first database.

26. The computer-readable medium of claim 20 wherein the first data comprises a base transceiver station (BTS) code, a base station controller (BSC) code, and a sector code.

27. The computer-readable medium of claim 26 wherein, the BTS code represents a BTS,
the BCS code represents a BCS that controls the BTS; and
the sector code indicates an operational status of at least one sector of the BTS.

28. The computer-readable medium of claim 26 wherein the second data comprises a basic trading area code and a site code.

29. The computer-readable medium of claim 28 wherein the basic trading area code corresponds to the BSC and the site code corresponds to the BTS.

30. The computer-readable medium of claim 28 wherein the status displayed comprises the BTS code, the BSC code, the basic trading area code, the site code, and the sector code.

31. A method for providing element outage monitoring in a wireless telecommunication system comprising:
obtaining data indicating a state of the element in the wireless telecommunication system, wherein said obtaining step includes querying a first database for first data, querying a second database using the first data to obtain second data; and
outputting a status to a display if the state comprises a first condition, the first data comprising a base transceiver station (BTS) code, a base station controller code (BSC), and a sector code.

32. The method of claim 31 wherein,
the BTS code represents a BTS,
the BSC code represents a BSC that controls the BTS; and
the sector code indicates an operational status of at least one sector of the BTS.

33. The method of claim 31 wherein the second data comprises a basic trading area code and a site code.

34. The method of claim 33 wherein the basic trading area code corresponds to the BSC and the site code corresponds to the BTS.

35. The method of claim 33 wherein the status displayed comprises the BTS code, the BSC code, the basic trading area code, the site code, and the sector code.

* * * * *